July 18, 1967

O. BLASCHEK ET AL 3,331,653

LOW-NOISE MOTION PICTURE CAMERA

Filed Feb. 23, 1965

Inventors
Otto Blaschek
Erich Kastner
By Stevens, Davis, Miller & Mosher
Attorneys.

July 18, 1967   O. BLASCHEK ET AL   3,331,653
LOW-NOISE MOTION PICTURE CAMERA
Filed Feb. 23, 1965
3 Sheets-Sheet 2
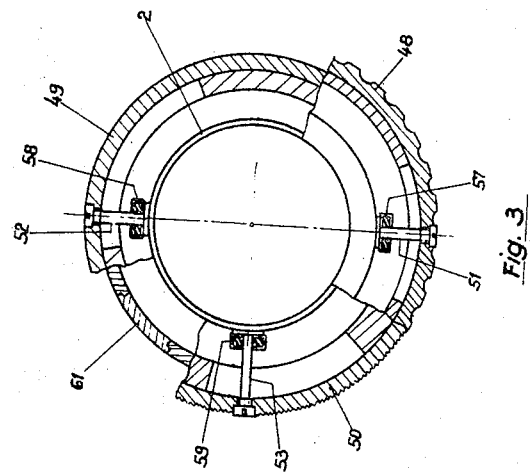
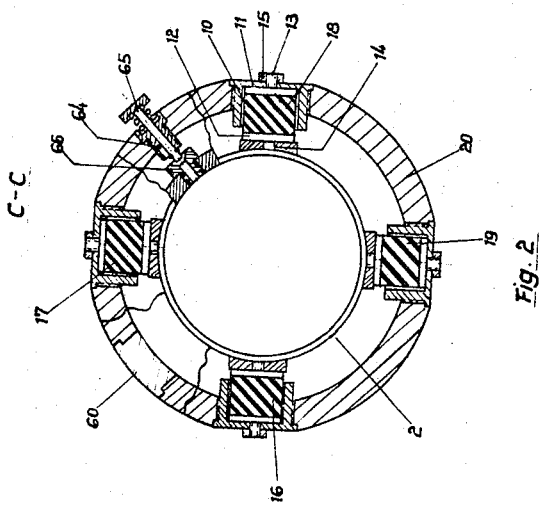
Inventors
Otto Blaschek
Erich Kastner
By Stevens Davis Miller & Mosher
Attorneys

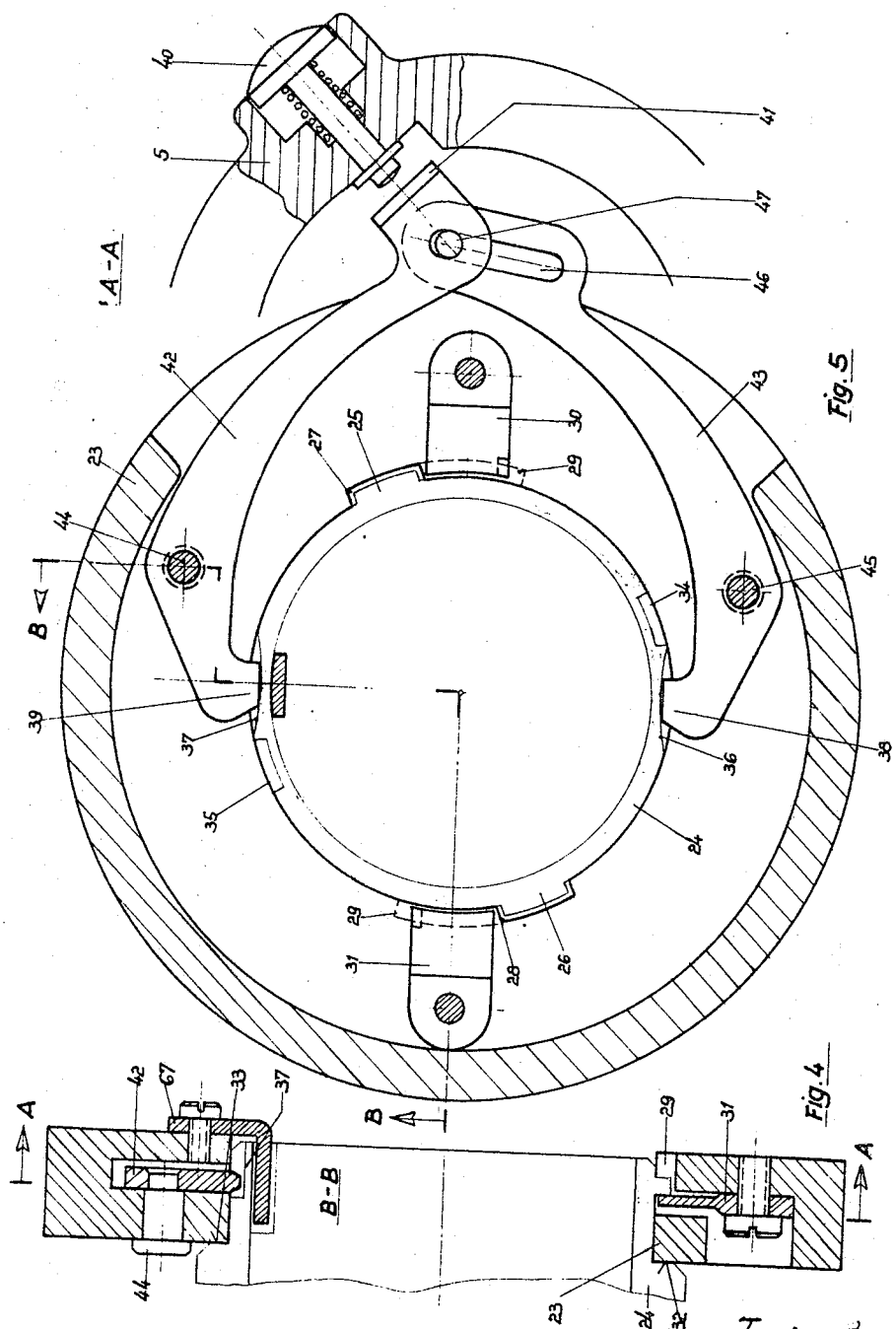

3,331,653
LOW-NOISE MOTION PICTURE CAMERA
Otto Blaschek, Dornach 49, and Erich Kästner, Turkenstrasse 91, both of Munich, Germany
Filed Feb. 23, 1965, Ser. No. 434,239
Claims priority, application Germany, Feb. 29, 1964,
A 45,362
9 Claims. (Cl. 352—35)

ABSTRACT OF THE DISCLOSURE

A suspension system for a motion picture camera having the camera drive mechanism suspended by vibration dampening connectors in a camera housing and the lens suspended by vibration dampening connectors in a shell, the lens being interlocked with the camera drive mechanism and the shell being interlocked with the camera housing in order to suppress noise emanating from the camera drive mechanism.

---

Figure 1:
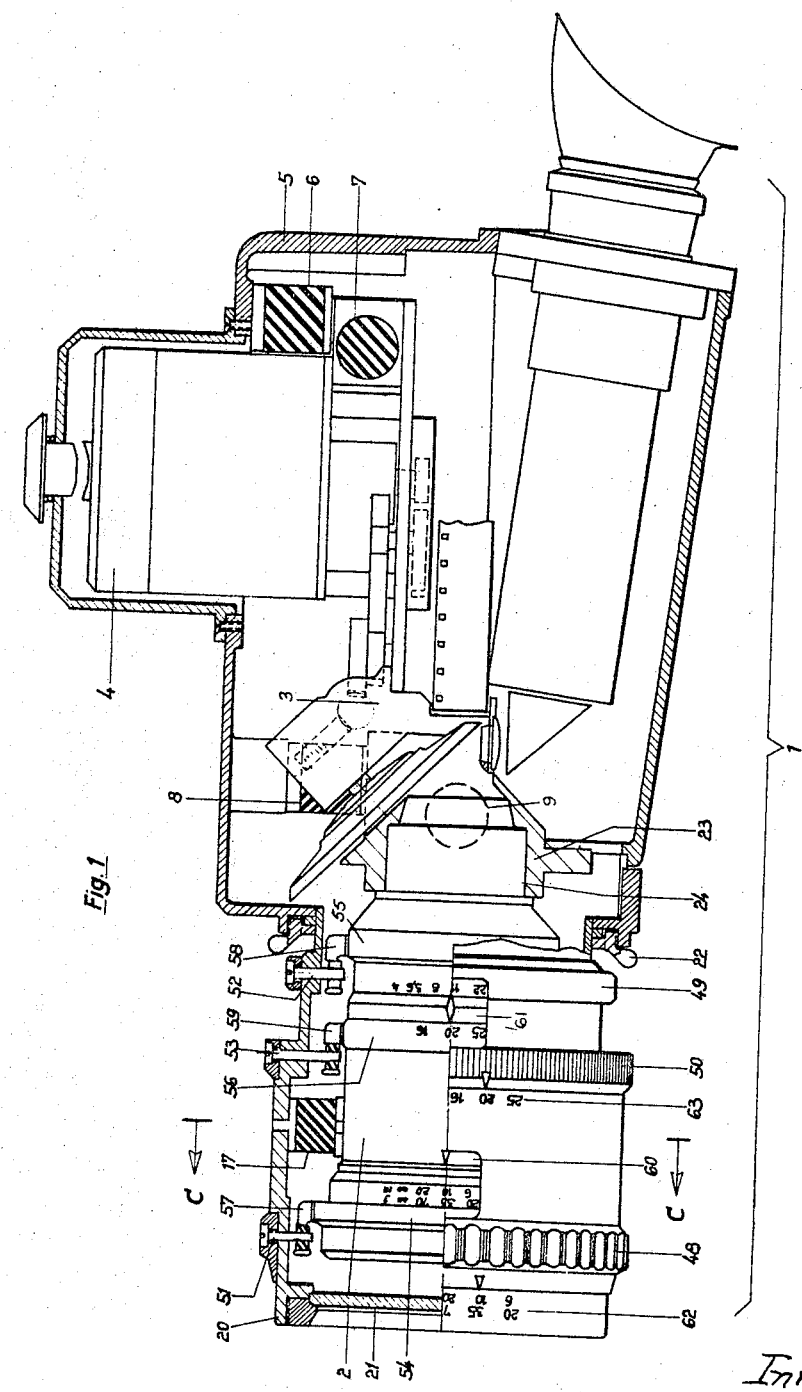

This invention relates to a low-noise motion picture camera, which comprises an interchangeable lens and in which the noise-generating camera structure and the lens are surrounded by a sound absorbing housing.

For a long time, there has been a desire for an efficient motion picture camera which has an interchangeable lens and runs so smoothly as to enable high-quality sound recordings, whereas it remains light in weight and handy for use as a news camera.

There are two solutions to the problem residing in these mutually conflicting requirements. It can be attempted to reduce the noise itself by a design which inherently produces only a small noise. This suggestion involves necessarily a high expenditure and can be successful only in a heavy studio camera, as will be set forth hereinafter.

The technical development of studio cameras will now be described. The first low-noise camera was placed on the market several decades ago and was a so-called inherently blimped camera because the complete camera structure as well as the lens were permanently mounted in a sound absorbing housing whereas the camera housing proper was eliminated. The lens was adjusted from the rear of the housing. Any noise which was generated had to be absorbed by the sound absorbing housing. This required extremely large wall thicknesses and weights, which are now intolerable. For this reason, such a camera can no longer be sold even as a studio camera.

Another studio camera, which is now on the market, must also be described substantially as an inherently blimped camera. To make the camera lighter in weight and handier at least for studio use, a smoothly running camera mechanism was provided by the adherence to extremely high precision. The lens may protrude from the sound-absorbing housing because the original noise of the camera structure has been reduced by an extremely high precision involving a very high expenditure.

In motion picture cameras which should be usable also without a stand, particularly for news films, the following solution has been adopted. The provision of noise suppressing means was accompanied by a reduction of the equipment which renders the camera versatile so that the cost and weight were reasonable in comparison with other known cameras. For this reason, the only advantage of these known cameras over other known cameras is the noise suppression. This noise suppression is also achieved in that the simplified complete camera housing is directly suspended by means of buffers on a baseplate in a sound absorbing housing, which is lined with sound absorbing material. The lens extends also from the sound absorbing housing. In this case, the attenuated noise is inevitably transmitted out of the sound absorbing housing. For this reason the noise level of these less versatile cameras is too high in many cases.

Many years ago, the applicants have made their own universal camera with means for suppressing the noise so that the camera can be used in a studio and have used means which differ from the prior art described. They have provided their commercial camera with a sound absorbing housing. This camera remains usable as a news camera without stand and on the other hand is suitable without restriction as a studio camera. When provided with the blimp, however, this camera is too heavy and unhandy for use outside the studio and without a stand. For these purposes, the blimpless camera of the applicants has maintained its position on the market against the camera described hereinbefore in spite of the inferior noise attenuation.

In view of the state of the art, it is an object of the invention to provide a camera which embodies a solution to all problems set forth hereinafter:

(1) The efficiency of the known camera of the applicants must not be reduced;

(2) The economy of the design must not be lost by a further increase in precision; the problem must not be solved by a substantial reduction of the original noise;

(3) The weight must be much lower than that of the known camera of the applicants with blimp.

This object is solved according to the invention in a motion picture camera of the kind defined first hereinbefore by a two-part sound absorbing arrangement, in which the noise generating camera structure is suspended with vibration dampening connectors in a camera housing and the lens is suspended with vibration dampening connectors in a shell which has a front window, the lens being interlocked with the camera structure and the lens shell being interlocked with the camera housing. The advance represented by the invention is particularly apparent when it is realized that the camera according to the invention has all advantages of the known motion picture camera of the applicants and in this respect is superior to the described known cameras which are suitable as news cameras, and that the noise level has been substantially reduced; this is another advantage of the camera according to the invention.

In a development of the invention, the camera is characterized in that the lens and the shell surrounding the lens are combined in a unit and the shell is provided with elements for adjusting the focus, the iris diaphragm and, if desired, the focal length. This unit simplifies the change of the lens and has the further advantage that the lens shell forms a package for the lens. Compared to a normal package, the unit has the advantage that the lens is always protected from damage.

In order to facilitate the checking of the focus, iris diaphragm and, if desired, focal length adjustments by all persons responsible for the setting of the camera, it is a feature of the invention that the shell which surrounds the lens is provided with at least one window which exposes the original scales on the lens and that the shell which surrounds the lens is provided with additional, magnified scales for the adjusting elements.

To avoid a fatigue of the vibration dampening connectors as a result of the repeated change of the lenses, the invention provides means, such as a spring-loaded plug or stops, for establishing between the lens and its shell a connection which renders the vibration dampening connectors ineffective or relieving them during the locking and unlocking. The rotary movement which is required during the change of the lens is then taken up by the plug or stops and no force is transmitted to the vibration dampening connectors.

The two housing parts are interlocked by a bayonet-like joint or a cap nut or a combination of a bayonet-like joint and a cap nut. According to the invention, the lens and the camera structure are interlocked by a bayonet joint connecting the lens socket of the camera structure and the lens fitting. A leaf spring is secured in the lens socket and acts in an axial direction toward the lens abutment and engages the front face of the noses of the lens fitting. A latch is provided, which is releasable from the outside and which locks the noses of the lens fitting in a predetermined angular position with respect to the optical axis. These locking means ensure an exact positioning of the lens by its fitting in the lens socket of the camera structure and a predetermined angular position of the scales on the lens with respect to the optical axis.

Being suspended by vibration dampening connectors in a shell, the lens and shell have an increased weight and size. For this reason it was necessary to provide a somewhat larger diametral tolerance for the fit between the lens fitting and the lens socket of the camera body in order to facilitate a rapid changing, particularly inserting, of the lens. This larger tolerance is enabled by the leaf springs acting axially against the abutment. It will be appreciated that this feature of the invention can be used to advantage also independently of the noise suppression of a motion picture camera having an interchangeable lens in all cases where a relatively long lens is used because the insertion of the fitting of such lenses into the lens socket of the camera body is much more difficult than with lenses having a shorter overall length.

As applied to cameras provided with lenses having a large overall length, the suspension of the lens by vibration dampening connectors in a shell which has a front window, as suggested by the invention, may be designed so that the lens is supported in the shell by the vibration dampening connectors close to or before the center of gravity of the lens. In this case the lens shell together with the vibration dampening connectors serve as a lens support.

According to the invention, the front glass is interchangeably mounted on the shell so that it may be interchanged against light filters.

An embodiment of the invention will be explained by way of example in the following description with reference to the drawing, in which FIG. 1 is a view partly in longitudinal section showing a low-noise camera according to the invention and FIG. 2 a sectional view taken on line C—C in FIG. 1, FIG. 3 shows various broken-away transverse sectional views through adjusting elements of the lens and shell provided by the invention, FIG. 4 is a longitudinal sectional view showing the locking means for the lens, and FIG. 5 is a sectional view taken on line A—A in FIG. 4.

As is best apparent from FIG. 1, the low-noise motion picture camera 1 having an interchangeable lens 2 is surrounded by a sound absorbing housing. According to the invention, the sound absorbing means are divided into two parts. The camera structure generally indicated at 3, which generates the noise, is suspended together with the motor 4 with the aid of a baseplate, to which all parts of the camera structure are secured, in the camera housing 5 by means of a plurality of vibration dampening connectors, of which the connectors 6 to 9 are apparent from FIG. 1.

As is best apparent from FIG. 2, a vibration dampening connector consists of a rubber buffer 10, which is bonded between two metal discs 11, 12. Each metal disc is provided with a threaded stud 13 or 14, which is threaded into a mating, tapped bore of the camera structure or the camera housing. Alternatively the vibration dampening connector may be locked by a nut 15 as shown in FIG. 2.

The lens 2 is also suspended with vibration dampening connectors, in the embodiment shown with four vibration dampening connectors 16–19, in a shell 20, as is best apparent from FIGS. 1 and 2. As is shown in FIG. 1, the shell 20 is provided with a front window 21.

The lens 2 interlocks only with the camera structure 3 and the lens shell 20 interlocks only with the camera housing 5. The interlock of the shell 20 with the camera housing 5 is best apparent from FIG. 1. The interlock of the lens 2 with the camera structure 3 is best apparent from FIGS. 4 and 5. The lens shell 20 and the camera housing 5 are provided with interlocking elements similar to a bayonet joint (FIG. 1). These elements are not shown in detail in the drawing. The resulting interlocking connection is fixed by a cap nut 22. The lens 2 and the camera body 3 are also interlocked by a bayonet joint between the lens socket 23 of the camera body 3 and the fitting 24 of the lens 2. As is apparent from FIGS. 4 and 5, the fitting 24 of the lens 2 is provided with two noses 25, 26, which are suitably spaced 180° apart. The lens socket 23 is provided with grooves 27, 28, which extend in the direction of the optical axis and receive the noses 25, 26 of the lens fitting 24. At the end of the grooves 27, 28, the lens socket 23 is provided with a radial recess 29, which receives the noses 25, 26 upon a rotation of the lens. Associated with each groove 27, 28 and at any desired angle to it is a leaf spring 30 or 31, which is secured in the lens socket 23. These springs are also spaced 180° apart. When the noses 25, 26 of the lens fitting 24 are turned into the recess 29, the leaf springs 30, 31 are stressed and engage these noses so that the shoulder 32 of the lens fitting 24 is firmly applied against the lens abutment 33 and the lens is thus perfectly positioned relative to the image plane of the camera body 3. To lock the lens fitting against rotation from its predetermined angular position, the lens fitting is provided with one or more locking grooves, such as 34, 35. Cams 36, 37 of the lens fitting are engaged by latches 38, 39. When the lens fitting is turned in the clockwise sense from the angular position shown in FIG. 5, these latches fall into the locking groove or grooves, such as 34, 35, to lock the lens against a rotation from its angular position. To change the lens, a spring-loaded push button 40 mounted in the camera housing 5 must be depressed against the spring pressure. The push button 40 will then engage a pressure plate 41 of one of two double-armed levers 42, 43 arranged like scissors. Each lever is mounted on a pin 44, 45. The shorter, free lever arms form the latches 38, 39. The other, longer lever arm of the lever 43 is provided at its end with a longitudinal slot 46, which receives a pin 47 of the longer lever arm of the other lever 42. With this arrangement of the latch levers it will be appreciated that the latches will be released when the push button 40 is depressed. The lens can then be changed.

As is apparent from FIGS. 1 and 3, the lens shell 20 is provided with means 48, 49, 50 for the adjustment of the focus iris diaphragm and focal length. These adjusting means consist of rough adjusting rings. The connection between these rings and the corresponding adjusting elements on the lens 2 is apparent from FIG. 3. Each external adjusting element 48–50 on the lens shell is provided, e.g., with at least one driver pin 51, 52, 53, which engages a guide 57, 58, 59 secured to the respective adjusting ring 54, 55, 56 on the lens (see also FIG. 1). In order to protect the lens and shell from structure-borne noise, the guides 57–59 secured to the adjusting rings 54–56 on the lens and engaged by the driver pins 51–53 must be rubber-insulated. In FIG. 3, the adjusting elements are shown in one plane. As is indicated by break lines and distinctly apparent from FIG. 1, they are arranged one behind the other in the direction of the optical axis.

It is apparent from FIGS. 1 and 2 that the shell 20 which surrounds the lens 2 is provided with windows 60, 61 exposing the original scales on the lens 2. Additional, magnified scales, such as 62 and 63, for the adjusting elements are provided on the lens shell, as is apparent from FIG. 1.

FIG. 2 shows that the shell 20 is provided with a bushing 64 for a resiliently mounted plug 65. The plug 65 can be inserted against the spring pressure into a socket 66 mounted on the lens 2 to establish a rigid connection between the shell 20 and the lens 2 so that the rotation required to change the lens is not transmitted from the shell 20 to the lens 2 by the vibration dampening connectors.

To enable the use also of smaller lenses without lens shells in a camera having reduced noise suppression requirements, including the lenses used in the above-mentioned original camera of the applicants, an angled retaining finger 67, shown in FIGS. 4 and 5, serves as a guide for the focusing movement of the helical lens mount. The retaining finger holds at the same time the lens in its angular position whereas the beveled latches 38, 39 engage an annular conical recess in the outer portion of the screw thread of the lens mount and pull the shoulder of the lens against the lens socket of the camera structure.

What is claimed is:

1. The improvement in a light weight motion picture camera having an interchangeable lens with a plurality of adjusting rings mounted thereon and a camera drive mechanism, of a suspension system for suppressing noise inherent in said camera drive mechanism, comprising, a housing for said camera drive mechanism, a first vibration dampening means for suspending said camera drive mechanism within and out of contact with said housing, a shell for said interchangeable lens and said plurality of adjusting rings mounted thereon, a second vibration dampening means for suspending said interchangeable lens and said plurality of adjusting rings mounted thereon, within and out of contact with said shell, a first interlocking means for locking said interchangeable lens to said camera drive mechanism, and a second interlocking means for locking said shell to said housing.

2. The improvements as defined in claim 1 wherein said second interlocking means includes bayonet-joint-like elements.

3. An improvement as defined in claim 1, wherein said first interlocking means includes noses mounted on said lens, a socket mounted on said camera drive mechanism having grooves for receiving said noses, and latching means for engaging said lens in said socket in a predetermined angular position.

4. The improvement as defined in claim 1 wherein said shell has a mounting for detachably mounting a face glass at one end thereof.

5. The improvement as defined in claim 4 wherein said mounting for detachably mounting a face glass has a light filter mounted therein.

6. An improvement as defined in claim 1, including adjusting means positioned on the outside of said shell, and rubber insulated driving pins connecting said adjusting means to said adjusting rings mounted on said lens.

7. An improvement as defined in claim 6 including a set of scales positioned on said lens and a window in said shell through which said set of scales may be observed.

8. The improvement defined in claim 7, including means for providing a rigid connection between said shell and said lens to avoid fatigue of said second vibration dampening means as a result of repeated changes of said lens, said means for providing a rigid connection including a socket mounted on said lens, and a resiliently mounted plug positioned in said shell for insertion into said socket.

9. The improvement as defined in claim 8 including push button means for disengaging said latching means.

References Cited

UNITED STATES PATENTS

| 1,667,724 | 5/1928 | De Vry | 352—35 |
| 1,932,421 | 10/1933 | Ponting et al. | 352—35 |
| 1,975,309 | 10/1934 | Berkowitz | 88—24 |
| 2,031,608 | 2/1936 | Kiel | 352—35 |
| 2,196,358 | 4/1940 | Heinisch | 352—35 |
| 2,211,416 | 8/1940 | Goldsmith | 352—35 |
| 2,573,885 | 11/1951 | Whitman et al. | 352—242 X |
| 2,855,826 | 10/1958 | Jayet | 352—242 X |
| 3,057,278 | 10/1962 | Zill | 88—57 X |
| 3,160,227 | 12/1964 | Hautala | 352—35 X |

FOREIGN PATENTS 218,271  11/1961  Austria.

JULIA E. COINER, *Primary Examiner.*

NORTON ANSHER, *Examiner.*

V. A. SMITH, *Assistant Examiner.*